Aug. 26, 1941.  R. ANDRIEU  2,254,025
SAW-TOOTH WAVE GENERATOR
Filed Feb. 27, 1937
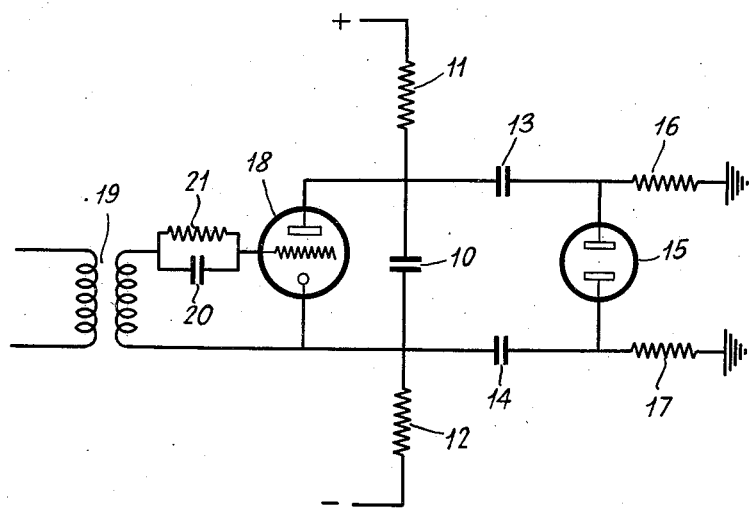
INVENTOR
ROBERT ANDRIEU
BY H.S. Grover
ATTORNEY Patented Aug. 26, 1941

2,254,025

UNITED STATES PATENT OFFICE 2,254,025

SAW-TOOTH WAVE GENERATOR

Robert Andrieu, Berlin, Germany, assignor to Telefunken Gesellschaft für Drahtlose Telegraphie m. b. H., Berlin, Germany, a corporation of Germany Application February 27, 1937, Serial No. 128,090
In Germany February 28, 1936

2 Claims. (Cl. 250—36)

My invention relates broadly to oscillator generators, and more particularly to a sawtooth wave generator especially of that type which is particularly adaptable for use with cathode ray tubes used for television purposes.

The present application is related to a previous application, Serial No. 124,977, filed February 10, 1937, and in the previous application there was disclosed a sawtooth wave generator comprising in general a condenser joined through two resistances of like value to the poles of a D. C. source of voltage while in parallel relationship to the condenser is the plate cathode circuit of a controlled discharge tube, preferably the high vacuum type. That arrangement operated in the following manner:

As long as the electron discharge tube is blocked, the upper or the lower plate of the condenser approached the potential of the positive or negative pole of the D. C. voltage source. The condenser and the two resistances form a time constant circuit and the charge of the condenser accordingly was a linear function as regards time. At a definite and desired interval, the plate cathode circuit of the controlled discharge tube was rendered conductive and the condenser discharged therethrough.

This previously explained method, however, was subject to the disadvantage that the grid circuit of the controlled discharge tube must be negatively biased, and in television apparatus this is particularly disadvantageous since in television receivers only one power pack furnishing current from a supply line is usually available. The output end of this power pack must be grounded at some suitable point and the result is the negative biased voltage for the control grid may not be derived from the power pack since the negative source may not be kept at a potential which is at a fixed value with reference to ground, and with respect to ground the grid experiences the same potential fluctuations as the filament of the tube. For this reason it would be necessary in order to bias the control grid circuit of the tube to furnish a distinct small sized power pack in which the secondary winding of the transformer and rectifier as well as condensers involved would have to be insulated from the primary winding of the transformer in the pack so that the D. C. voltage source could respond to and follow the potential variations of the filament of the tube.

In general, in order to avoid the use of such a separate power pack the grid bias is furnished by means of a condenser and grid leak arrangement which suitably biases the grid by means of the grid current.

My invention will best be understood by referring to the accompanying drawing, in which Fig. 1 is an embodiment of my invention.

Referring to Fig. 1, there is shown an embodiment of my invention. An electric storage element, in this case a condenser 10, has connected to one side thereof a resistor 11 and to the other terminal thereof a resistor 12, the latter in this case being substantially equal in value. The resistor 11 is joined to the positive terminal of a source of supply potential (not shown) and the resistor 12 is joined to the negative terminal of the same supply potential. Connected across the condenser 10 are two coupling condensers 13 and 14 which are adapted to transfer potentials or rather follow the potentials across condenser 10 and to press these on the deflecting plates of a cathode ray tube 15, the deflecting plates each being grounded through resistances 16 and 17. Connected in parallel with the condenser 10 is the anode-cathode path of a vacuum tube 18, and connected in the grid-cathode path of the tube is a secondary input transformer 19, and joined in series with the secondary winding and the grid is a time constant circuit comprising condenser 20 and resistance 21.

While tracing the side or flank of the sawtooth voltage curve which presents a moderate slope, the circuit operates in a similar way as described in my aforementioned patent application. To terminate the feebly sloped flank of the potential wave, a plate current is generated which is due to a voltage furnished from the secondary winding of transformer 19, the said current causing partial discharge of the condenser 10. Condenser 20 incidentally is again charged by the grid current of tube 18 to such an extent that while the feebly sloped flank of the sawtooth curve is traced, a sufficiently negative potential is available to prevent flow of plate current as long as the transformer 19 furnishes no voltage. Through the resistance 21 the charge of condenser 20 is allowed to slowly leak away, though the charge is replenished again by re-initiation of grid current flow occurring while the next markedly sloped or steep sawtooth flank is being traced. The time constant of the condenser 20 and of the resistance 21 is suitably greater than the duration of the feebly sloped sawtooth flank.

It will thus be seen that in the circuit arrangement as here disclosed, by the charging of a condenser included in the grid circuit, and discharge of this condenser through a resistance, the necessity is obviated to provide a distinct and special power pack for the production of the negative grid biasing potential, in fact, the grid biasing voltage is constantly generated by the grid current of the tube.

What is claimed is:

1. A sawtooth wave generator comprising means for storing electrical energy, a source of energy for supplying said stored energy, a first resistive member electrically connected between one of the poles of said source of energy and one terminal of said energy storage means, a second resistive member electrically connected between the other of the poles of said source of energy and the other terminal of said storage means, a thermionic tube having an anode, cathode and at least one control electrode, means for maintaining said tube normally impervious to current flow during the charging of said electrical energy storage means, said electrical storage element being connected in shunt to the spaced discharge path between the anode and cathode of said thermionic tube, and a time constant circuit connected in the cathode-control electrode circuit of said thermionic tube, said time constant circuit comprising the means for maintaining said tube normally impervious to current flow during the charging of said electrical energy storage means.

2. Apparatus in accordance with claim 1 wherein there is provided in addition, means for impressing signals from an external source onto the control electrode-cathode path of said thermionic tube.

ROBERT ANDRIEU.